(12) United States Patent
Yoshida

(10) Patent No.: US 6,195,510 B1
(45) Date of Patent: Feb. 27, 2001

(54) RANGEFINDER APPARATUS

(75) Inventor: Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/420,575

(22) Filed: Oct. 19, 1999

(30) Foreign Application Priority Data

Oct. 20, 1998 (JP) .................................................. 10-298677

(51) Int. Cl.$^7$ .............................. G03B 13/36; G01C 3/08
(52) U.S. Cl. ......................... 396/106; 396/120; 356/3.04
(58) Field of Search ...................................... 396/106, 120; 356/3.04, 3.05; 250/201.4, 201.6

(56) References Cited

U.S. PATENT DOCUMENTS 5,337,116 * 8/1994 Nonaka et al. ........................ 396/106
5,659,387 8/1997 Yoshida ................................. 356/4.01

FOREIGN PATENT DOCUMENTS 7-181038   7/1995 (JP) .

\* cited by examiner

Primary Examiner—W. B. Perkey
(74) Attorney, Agent, or Firm—Leydig, Voit & Mayer, Ltd.

(57) ABSTRACT

A rangefinder apparatus includes an infrared emitting diode (IRED) for projecting a luminous flux toward an object at a distance to be measured; a light detector for detecting reflected light of the luminous flux projected to the object, at a light-detecting position on a position sensitive detector corresponding to the distance to the object, and outputting a signal corresponding to the light-detecting position; an arithmetic unit for carrying out an arithmetic operation according to the signal output from the light detector, and outputting a distance signal corresponding to the distance to the object; an integrating capacitor, for carrying out a first integration by discharging or charging according to the signal output from the arithmetic unit, carrying out a second integration of a constant current, and comparing the resulting voltage to a reference voltage and outputting a comparison result signal, detecting the distance to the object according to the integrated signal; and a control for causing the IRED to start projecting light after a lapse of a time from after output of the comparison result signal.

5 Claims, 4 Drawing Sheets

RANGEFINDER APPARATUS

BACKGROUND OF THE INVENTION

1. Field of the Invention

The present invention n relates to a rangefinder apparatus for measuring the distance to an object and, in particular, to an active type rangefinder apparatus suitably used in a camera or the like.

2. Related Background Art

In active type rangefinder apparatus used in cameras and the like, an infrared light-emitting diode (IRED) projects a luminous flux toward an object to be measured, the reflected light of thus projected luminous flux is received by a position sensitive detector (PSD), a signal outputted from the PSD is arithmetically processed by a signal processing circuit and an arithmetic circuit and then is outputted as distance information, and the distance to the object is detected by a CPU. In general, since errors may occur when the distance is measured upon a single light-projecting operation, light is projected a plurality of times so as to obtain a plurality of distance information items, which are then integrated by an integrating circuit so as to be averaged.

SUMMARY OF THE INVENTION

However, there still exist cases where errors occur in distance measurement results even in the above-mentioned rangefinder apparatus.

For example, light is projected to the object a plurality of times at the timings indicated by the line 201 of FIG. 1 (light being projected when pulses are HIGH), and a capacitor charged with a reference voltage $V_{REF}$ is sequentially discharged in response to the distance information with respect to the object obtained by each light emission as indicated by the line 202 of FIG. 1 (first integration). Then, after a predetermined number of light emissions, the capacitor is charged with a constant current by a constant current source (second integration), and the time required for the second integration is measured. Such a distance measuring operation may continuously be carried out a plurality of times, and the distance to the object may be determined according to the results of individual distance measuring operations.

In this case, in view of the fact that the second integration time varies depending on the distance to the object, after a lapse of the maximum second integration time from the completion of the first integration time, the next distance measuring operation may be started. In this case, if the actual second integration time is shorter, it will take a longer time until the next distance measuring operation is started. As a consequence, the charging voltage may drop due to dielectric absorption in the capacitor, whereby the second integration time may elongate by $\Delta t_1$, $\Delta t_2$ due to the drops in charging voltage $\Delta V_1$, $\Delta V_2$, thus yielding errors in measurement.

In order to overcome such a technical problem, it is an object of the present invention to provide a rangefinder apparatus which can reduce errors in distance measurement.

For achieving such a problem, the rangefinder apparatus in accordance with the present invention comprises: light-projecting means for projecting a luminous flux toward an object to be measured; light-receiving means for receiving reflected light of the luminous flux projected to the object at a light-receiving position on a position sensitive detector corresponding to a distance to the object, and outputting a signal corresponding to the light-receiving position; arithmetic means for carrying out an arithmetic operation according to the signal outputted from the light-receiving means, so as to output a distance signal corresponding to the distance to the object; integrating means, having an integrating capacitor, for carrying out first integration by discharging or charging the integrating capacitor according to the signal outputted from the arithmetic means so as to integrate the signal outputted from the arithmetic means, then carrying out second integration by charging or discharging the integrating capacitor with a constant current, and comparing the voltage of the integrating capacitor and a reference voltage with each other upon the second integration, so as to output a comparison result signal corresponding to the result of comparison; and detecting means for detecting the distance to the object according to the signal outputted from the integrating means; the rangefinder apparatus further comprising control means for causing the light-projecting means to restart projecting light after a lapse of a predetermined time from when the outputting of the comparison result signal from the integrating means is completed, so as to cause the integrating means to output a plurality of comparison result signals with respect to the same object, and causing the detecting means to detect the distance according to the plurality of comparison result signals.

In accordance with the present invention, when a plurality of distance measuring operations are carried out so as to determine the distance to the object to be measured, after a lapse of a predetermined time from the time when the second integration in one distance measuring operation is completed, the next distance measuring operation is started, whereby errors in measurement can be reduced, and the accuracy in distance measurement can be improved. Also, as the next distance measuring operation is started after a lapse of a predetermined time from the completion of the second integration in one distance measuring operation, the distance measuring time required for a plurality of distance measuring operations can be shortened.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, an embodiment of the present invention will be explained in detail with reference to the accompanying drawings. Here, the following explanation relates to a case where an active type rangefinder apparatus is employed as a rangefinder apparatus of an autofocus type camera.

Figure 1:
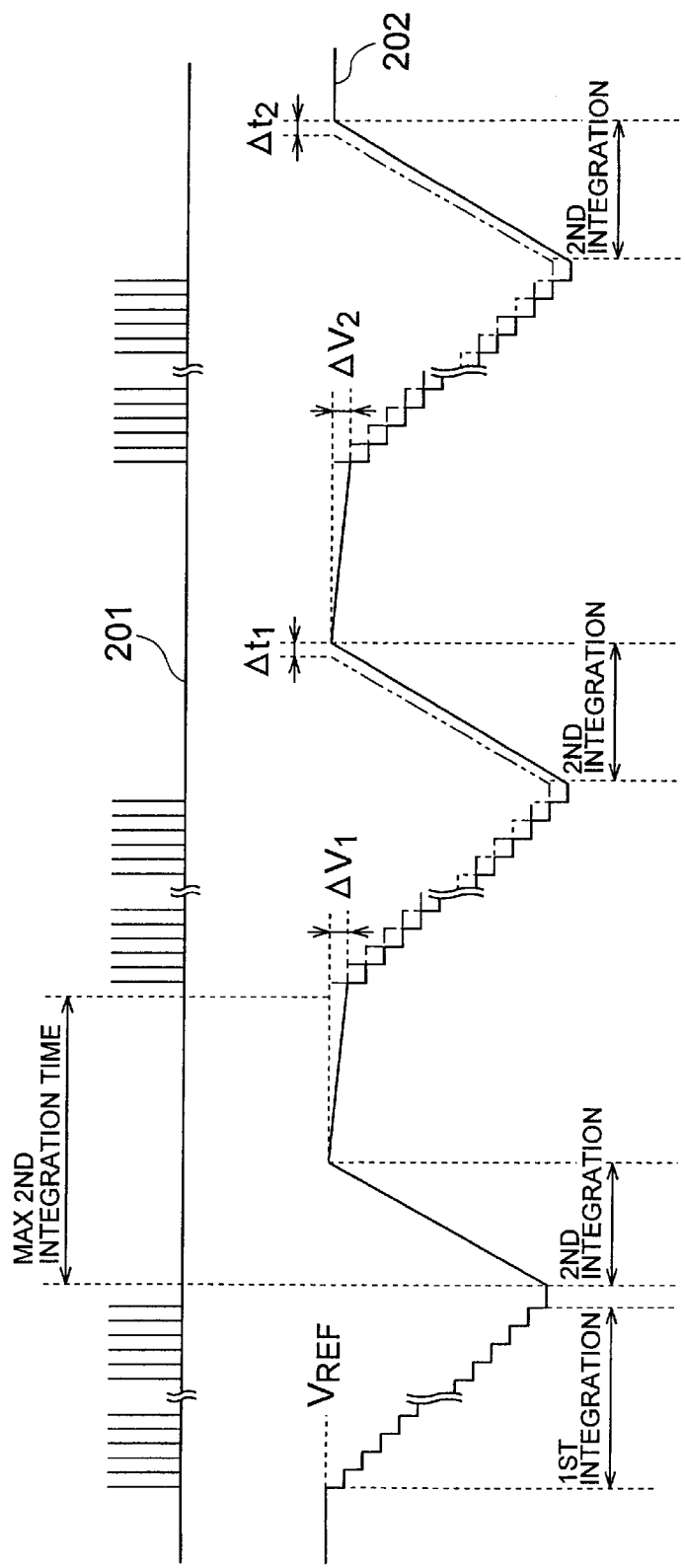
FIG. 1 is a timing chart for explaining operations of a conventional rangefinder apparatus.
Figure 2:
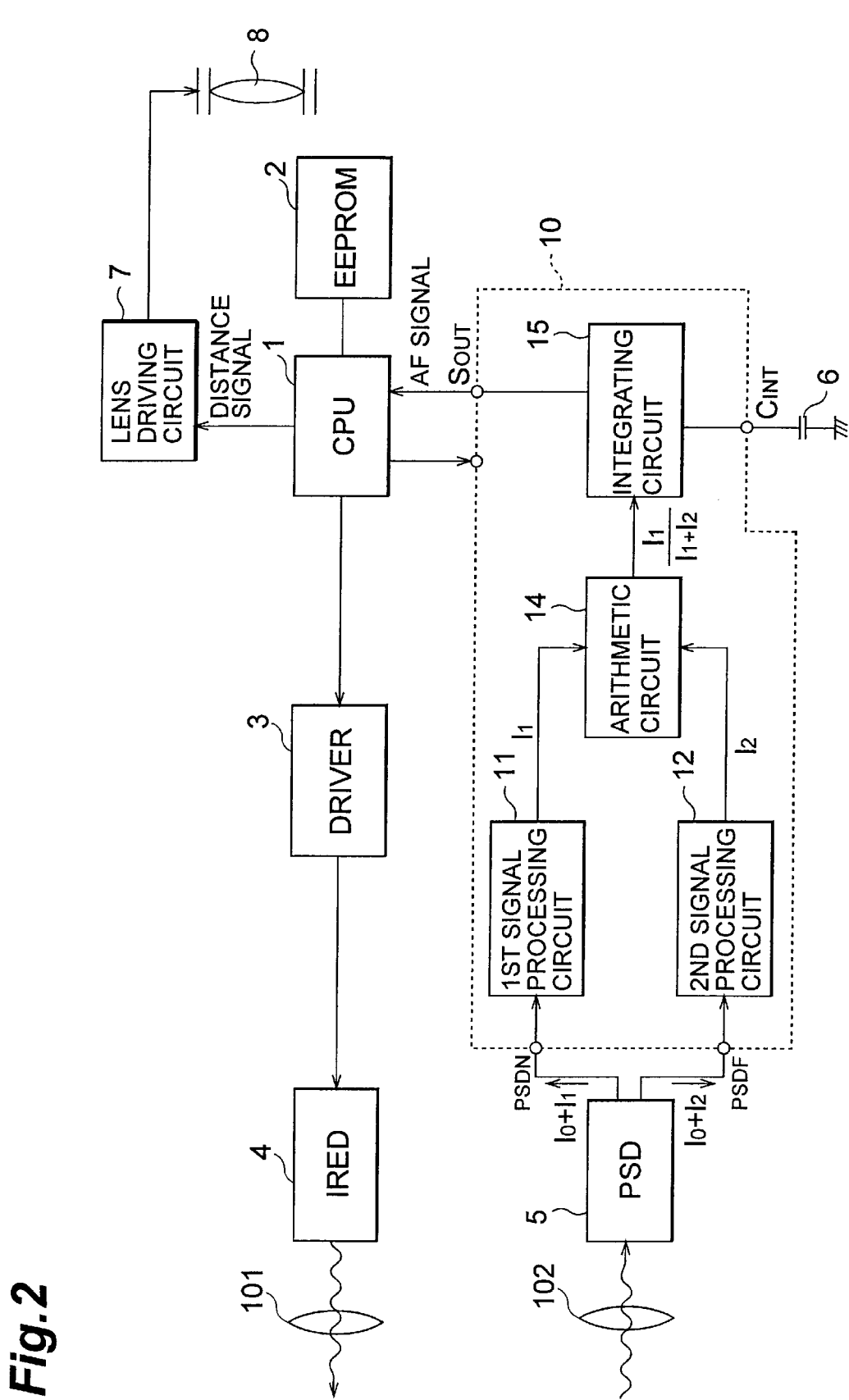
FIG. 2 is a configurational view of the rangefinder apparatus in accordance with an embodiment of the present invention.

FIG. 2 is a configurational view of the rangefinder apparatus in accordance with this embodiment. A CPU 1 is used for controlling the whole camera equipped with this rangefinder apparatus, and controls the whole camera including the rangefinder apparatus according to a program and parameters prestored in an electrically erasable and programmable read-only memory (EEPROM) 2. In this rangefinder apparatus, the CPU 1 regulates a driver 3, so as to control the emission of infrared light from an IRED (infrared light-emitting diode) 4. Also, the CPU 1 controls actions of an autofocus IC (AFIC) 10, and inputs the AF signal outputted from the AFIC 10.

By way of a light-projecting lens 101 disposed at the front face of the IRED 4, the infrared light emitted from the IRED 4 is projected onto the object to be measured. The infrared light is partly reflected by the object, and the resulting reflected light is received, by way of a light-receiving lens 102 disposed at the front face of a PSD (position sensitive detector) 5, at a position on the light-receiving surface of the PSD 5. This light-receiving position corresponds to the distance to the object.

The PSD 5 outputs two signals $I_1$ and, $I_2$ which correspond to the light-receiving position. The signal $I_1$ is a near-side signal which has a greater value as the distance is shorter if the quantity of received light is constant, whereas the signal $I_2$ is a far-side signal which has a greater value as the distance is longer if the quantity of received light is constant. The sum of the signals $I_1$ and $I_2$ represents the quantity of reflected light received by the PSD 5. The near-side signal $I_1$ is inputted to the PSDN terminal of the AFIC 10, whereas the far-side signal $I_2$ is inputted to the PSDF terminal of the AFIC 10. In practice, however, depending on external conditions, there are cases where respective signals in which a steady-state light component $I_0$ is added to the near-side signal $I_1$ and far-side signal $I_2$ are fed into the AFIC 10.

The AFIC 10 is an integrated circuit (IC) constituted by a first signal processing circuit 11, a second signal processing circuit 12, an arithmetic circuit 14, and an integrating circuit 15. The first signal processing circuit 11 inputs therein a signal $I_1+I_0$ outputted from the PSD 5, and eliminates the steady-state light component $I_0$ therefrom, thereby outputting the near-side signal $I_1$. The second signal processing circuit 12 inputs therein a signal $I_2+I_0$ outputted from the PSD 5, and eliminates the steady-state light component $I_0$ therefrom, thereby outputting the far-side signal $I_2$.

The arithmetic circuit 14 inputs therein the near-side signal $I_1$ outputted from the first signal processing circuit 11 and the far-side signal $I_2$ outputted from the second signal processing circuit 12, calculates the output ratio ($I_1/(I_1+I_2)$), and outputs an output ratio signal representing the result thereof. Here, the output ratio ($I_1/(I_1+I_2)$) represents the light-receiving position on the light-receiving surface of the PSD 5, i.e., the distance to the object.

The integrating circuit 15 inputs therein the output ratio signal and, together with an integrating capacitor 6 connected to the $C_{INT}$ terminal of the AFIC 10, accumulates the output ratio a plurality of times, thereby improving the S/N ratio. Thus accumulated output ratio is outputted from the $S_{OUT}$ terminal of the AFIC 10 as the AF signal. The CPU 1 inputs therein the AF signal outputted from the AFIC 10, converts the AF signal into a distance signal by carrying out a predetermined arithmetic operation, and sends out the resulting distance signal to a lens driving circuit 7. According to this distance signal, the lens driving circuit 7 causes a taking lens 8 to effect a focusing action.

Figure 3:
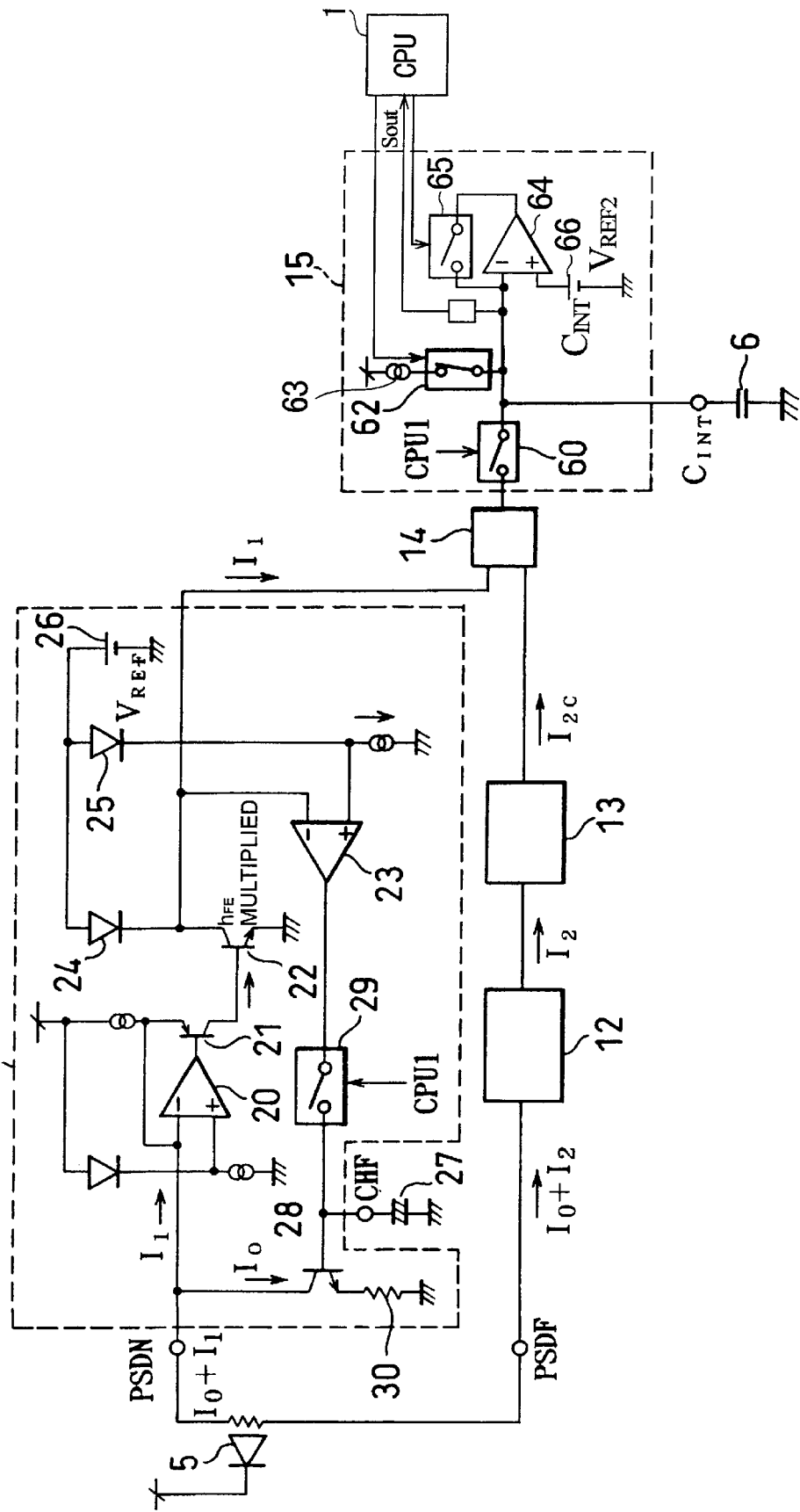
FIG. 3 is a circuit diagram of the first signal processing circuit and integrating circuit in the rangefinder apparatus in accordance with the above-mentioned embodiment; and, FIG. 4 is a timing chart for explaining operations of the rangefinder apparatus in accordance with the above-mention embodiment.

More specific respective circuit configurations of the first signal processing circuit 11 and integrating circuit 15 in the AFIC 10 will now be explained. FIG. 3 is a circuit diagram of the first signal processing circuit 11 and integrating circuit 15. Here, the second signal processing circuit 12 has a circuit configuration similar to that of the first signal processing circuit 11.

As mentioned above, the first signal processing circuit 11 is a circuit which inputs therein the near-side signal $I_1$ with the steady-state light component $I_0$ outputted from the PSD 5, eliminates the steady-state light component $I_0$, and outputs the near-side signal $I_1$. Namely, the near-distance-side terminal of the PSD 5 is connected to the "−" input terminal of an operational amplifier 20 in the first signal processing circuit 11 by way of the PSDN terminal of the AFIC 10. The output terminal of the operational amplifier 20 is connected to the base terminal of a transistor 21, whereas the collector terminal of the transistor 21 is connected to the base terminal of a transistor 22. The collector terminal of the transistor 22 is connected to the "−" input terminal of an operational amplifier 23 and also to the arithmetic circuit 14. Further, the cathode terminal of a compression diode 24 is connected to the collector terminal of the transistor 22, whereas the cathode terminal of a compression diode 25 is connected to the "+" input terminal of the operational amplifier 23. A first reference power source 26 is connected to the respective anode terminals of the compression diodes 24 and 25.

Also, a steady-state light eliminating capacitor 27 is externally attached to the CHF terminal of the AFIC 10, and is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of the steady-state light eliminating transistor 28 is connected to the "−" input terminal of the operational amplifier 20, whereas the emitter terminal of the transistor 28 is grounded by way of a resistor 30.

The integrating circuit 15 has the following configuration. The integrating capacitor 6 externally attached to the $C_{INT}$ terminal of the AFIC 10 is connected to the output terminal of the arithmetic circuit 14 by way of a switch 60, and to a constant current source 63 by way of a switch 62. Also, it is connected to the output terminal of an operational amplifier 64 by way of a switch 65, and directly to the "−" input terminal of the operational amplifier 64. Further, its potential is outputted from the $S_{OUT}$ terminal of the AFIC 10. The switches 60, 62, and 65 are controlled by control signals from the CPU 1. Also, a second reference power source 66 is connected to the "+" input terminal of the operational amplifier 64.

The outline of operations of thus configured AFIC 10 will now be explained with reference to FIGS. 2 and 3.

When not causing the IRED 4 to emit light, the CPU 1 keeps the switch 29 of the first signal processing circuit 11 in its ON state. The steady-state light component $I_0$ outputted from the PSD 5 at this time is inputted to the first signal processing circuit 11, and is amplified as a current by the current amplifier constituted by the operational amplifier 20 and the transistors 21 and 22. Thus amplified signal is logarithmically compressed by the compression diode 24, so as to be converted into a voltage signal, which is then fed to the "−" input terminal of the operational amplifier 23. When the signal inputted to the operational amplifier 20 is higher, the cathode potential of the compression diode 24 becomes higher, thus increasing the signal outputted from the operational amplifier 23, whereby the steady-state light eliminating capacitor 27 is charged. As a consequence, a base current is supplied to the transistor 28, so that a collector current flows into the transistor 28, whereby, of the signal $I_0$ fed into the first signal processing circuit 11, the signal inputted to the operational amplifier 20 decreases. In the state where the operation of this closed loop is stable, all of the signal $I_0$ inputted to the first signal processing circuit 11 flows into the transistor 28, whereby the charge corresponding to the base current at this time is stored in the steady-state light eliminating capacitor 27.

When the CPU 1 turns OFF the switch 29 while causing the IRED 4 to emit light, of the signal $I_1+I_0$ outputted from the PSD 5 at this time, the steady-state light component $I_0$ flows as the collector current into the transistor 28 to which the base potential is applied by the charge stored in the steady-state light eliminating capacitor 27, whereas the near-side signal $I_1$ is amplified as a current by the current amplifier constituted by the operational amplifier 20 and the transistors 21 and 22 and then is logarithmically compressed by the compression diode 24, so as to be converted into and outputted as a voltage signal. Namely, from the first signal processing circuit 11, the near-side signal $I_1$ is outputted alone after the steady-state light component $I_0$ is eliminated, and thus outputted near-side signal $I_1$ is inputted to the arithmetic circuit 14. From the second signal processing circuit 12, on the other hand, as with the first signal processing circuit 11, the far-side signal $I_2$ is outputted alone after the steady-state light component $I_0$ is eliminated, and thus outputted far-side signal $I_2$ is inputted to the arithmetic circuit 14.

The near-side signal $I_1$ outputted from the first signal processing circuit 11 and the far-side signal $I_2$ outputted from the second signal processing circuit 12 are inputted to the arithmetic circuit 14, and the output ratio $(I_1/(I_1+I_2))$ is calculated by the arithmetic circuit 14 and is outputted to the integrating circuit 15. While the IRED 4 is emitting a predetermined number of pulses of light, the switch 60 of the integrating circuit 15 is kept in its ON state, whereas the switches 62 and 65 are turned OFF, whereby the output ratio signal outputted from the integrating circuit 14 is stored in the integrating capacitor 6. When a predetermined number of pulse light emissions are completed, then the switch 60 is turned OFF, whereas the switch 65 is turned ON, whereby the charge stored in the integrating capacitor 6 is reduced by the charge having an opposite potential supplied from the output terminal of the operational amplifier 64.

The CPU 1 monitors the potential of the integrating capacitor 6, so as to measure the time required for regaining the original potential, and determines the AF signal according to thus measured time, thereby determining the distance to the object.

Operations of the rangefinder apparatus in accordance with this embodiment will now be explained.

Figure 4:
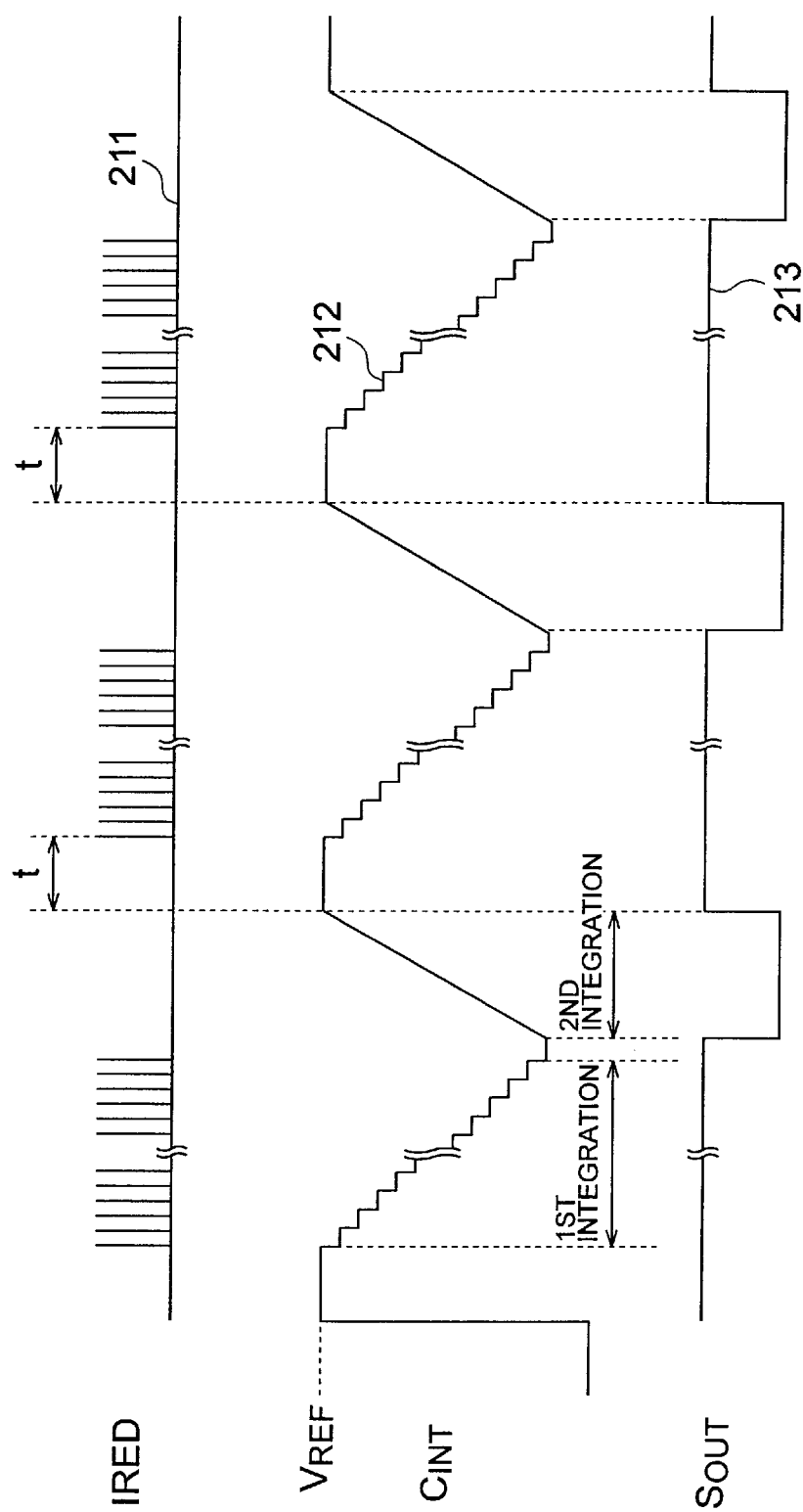

In FIG. 4, the line 211 is the light emission control signal (hereinafter referred to as "IRED signal") outputted from the CPU 1 to the driver 3, the line 212 is the charging voltage of the integrating capacitor 6, and the line 213 is the signal outputted from the $S_{OUT}$ terminal.

When the release button of the camera is half-pushed, so as to initiate a distance measuring state, a power source voltage supply is resumed in the AFIC 10, and the switch 65 is turned ON, whereby the integrating capacitor 6 is preliminarily charged until it attains a reference voltage $V_{REF}$ (see the left end portion of the line 212 of FIG. 4). After the completion of preliminary charging, the switch 65 is turned OFF.

Then, the IRED signal indicated by the line 211 of FIG. 4 is outputted from the CPU 1 to the driver 3, and the IRED 4 emits infrared light in a pulsing fashion as the driver 3 is driven. The infrared light emitted from the IRED 4 is reflected by the object to be measured, and thus reflected light is received by the PSD 5. Here, though the IRED 4 emits light at the rising edge of each pulse of the IRED signal, each pulse is depicted like the line 211 of FIG. 4, for the sake of convenience, since the pulse width is narrow.

On the other hand, at the same time with the light emission of the IRED 4, the switch 29 of the first signal processing circuit 11 is turned OFF, so that the near-side signal $I_1$ without the steady-state light component $I_0$ is fed into the arithmetic circuit 14. Similarly, the far-side signal $I_2$ without the steady-state light component $I_0$ is fed from the second signal processing circuit 12 into the arithmetic circuit 14.

According to the near-side signal $I_1$ and far-side signal $I_2$, the arithmetic circuit 14 outputs data of the output ratio $I_1/(I_1+I_2)$. At the time when this output is stabilized, the switch 60 of the integrating circuit 15 is immediately turned ON, whereby a negative voltage corresponding to the output ratio outputted from the arithmetic circuit 14 is inputted to the integrating capacitor 6.

At the same time when the IRED 4 turns off its light (the IRED signal is LOW), the switch 60 of the integrating circuit 15 is turned OFF. Then, after a lapse of a signal error time (after 8 microseconds from when the IRED signal is set LOW), the switch 29 of the first signal processing circuit 11 is turned ON, whereby the steady-state light eliminating capacitor 27 starts storing the steady-state light component $I_0$ of the signal outputted from the PSD 5.

The integrating capacitor 6 of the integrating circuit 15 inputs the output ratio, i.e., distance information signal, outputted from the arithmetic circuit 14, and is discharged by a voltage value corresponding to the value of the distance information signal. Namely, as indicated by the line 212 of FIG. 4, the voltage of the integrating capacitor 6 decreases stepwise (first integration) as the distance signal is inputted therein every time the IRED 4 emits light. While the amount of voltage drop for each step is distance information per se, the sum of amounts of voltage drop obtained by individual pulse emissions of the IRED 4 is employed as distance information in this embodiment.

After the input to the integrating capacitor 6 by a predetermined number of light emissions is completed, the switch 60 is held in its OFF state, and the switch 62 is turned ON by a signal from the CPU 1. As a consequence, the integrating capacitor 6 is charged at a predetermined rate determined by the rating of the constant current source 63 (second integration).

During the period of this second integration, the voltage of the integrating capacitor 6 and the reference voltage $V_{REF}$ are compared with each other in terms of magnitude. If it is determined that they coincide with each other, then the switch 62 is turned OFF, so as to stop charging the integrating capacitor 6. Then, the CPU 1 measures the time required for the second integration. Since the charging speed due to the constant current source 63 is constant, the distance to the object upon the first distance measuring operation can be determined from the time required for the second integration.

After a lapse of a predetermined time t (e.g., after 1 ms) from the completion of outputting of the signal including the second integration time from the integrating circuit 15 to the CPU 1, the second distance measuring operation is started. Namely, the IRED signal indicated by the line 211 of FIG. 4 is outputted from the CPU 1 to the driver 3, and the IRED 4 emits infrared light in a pulsing fashion as the driver 3 is driven.

Also, at the same time with the light emission of the IRED 4, the switch 29 of the first signal processing circuit 11 is turned OFF, so that the near-side signal $I_1$ without the steady-state light component $I_0$ is fed into the arithmetic circuit 14. Further, the far-side signal $I_2$ without the steady-state light component $I_0$ is fed from the second signal processing circuit 12 into the arithmetic circuit 14. Then, the arithmetic circuit 14 outputs data of the output ratio $I_1/(I_1+I_2)$ according to the near-side signal $I_1$ and far-side signal $I_2$, and a negative voltage corresponding to this output ratio is fed into the integrating capacitor 6.

After the input to the integrating capacitor 6 by a predetermined number of light emissions is completed, the switch 60 is held in its OFF state, and the switch 62 is turned ON by a signal from the CPU 1. As a consequence, the integrating capacitor 6 is charged at a predetermined rate determined by the rating of the constant current source 63 (second integration).

During the period of this second integration, the voltage of the integrating capacitor 6 and the reference voltage $V_{REF}$ are compared with each other in terms of magnitude. If it is determined that they coincide with each other, then the switch 62 is turned OFF, so as to stop charging the integrating capacitor 6. Then, the CPU 1 measures the time required for the second integration. Since the charging speed due to the constant current source 63 is constant, the distance to the object upon the second distance measuring operation can be determined from the time required for the second integration.

Then, after a lapse of a predetermined time t (e.g., after 1 ms) from the completion of outputting of the signal including the second integration time from the integrating circuit 15 to the CPU 1, the third distance measuring operation is started. The third distance measuring operation is carried out similarly to the above-mentioned second distance measuring operation.

After a plurality of distance measuring operations are carried out, the distance to the object is determined according to the distance measurement results obtained in the individual distance measuring operations.

Thereafter, when the release button is completely pushed, the CPU 1 controls the lens driving circuit 7 according to thus determined distance, so as to cause the taking lens 8 to carry out an appropriate focusing action, and further performs exposure by opening the shutter (not depicted). Thus, upon a release operation, a series of photographing actions comprising preliminary charging, distance measurement (first integration and second integration), focusing, and exposure is carried out.

Thus, in the rangefinder apparatus in accordance with this embodiment, since a plurality of distance measuring operations are carried out, and the distance to the object to be measured is determined according to a plurality of distance measurement results, the distance can be obtained accurately. Also, since one distance measuring operation is started after a lapse of a predetermined time from the completion of the second integration in the previous distance measuring operation regardless of its distance measurement result, errors in measurement can be reduced, and the accuracy in distance measurement can be improved.

For example, as mentioned above, in view of the fact that the second integration time varies depending on the distance to the object to be measured, after a lapse of the maximum second integration time from the completion of the first integration, the next distance measuring operation may be started. In this case, however, if the actual second integration time is shorter, it will take a longer time until the next distance measuring operation is started. As a consequence, the charging voltage may drop due to dielectric absorption in the integrating capacitor, thereby elongating the second integration time, which may generate errors in measurement. Therefore, in the rangefinder apparatus in accordance with this embodiment, the next distance measuring operation is started after a lapse of a predetermined time from the completion of the second integration in one distance measuring operation, whereby the charging voltage of the integrating capacitor 6 is prevented from dropping, errors in measurement can be reduced, and the accuracy in distance measurement can be improved.

Also, in the rangefinder apparatus in accordance with this embodiment, as the next distance measuring operation is started after a lapse of a predetermined time from the completion of the second integration in one distance measuring operation, the distance measuring time required for a plurality of distance measuring operations can be shortened. As a consequence, the time parallax during the period from the starting of the release operation until the termination of exposure can be reduced.

Without being restricted to the above-mentioned embodiment, the present invention can be modified in various manners. For example, the present invention is also applicable to the case where the charging/discharging of the integrating circuit is the reverse of that in the above-mentioned embodiment, i.e., the integrating circuit in which a plurality of charging operations are carried out in the first integration such that the voltage of the integrating capacitor increases stepwise and then only one discharging operation is carried out in the second integration.

In accordance with the present invention, when the distance to the object to be measured is determined by carrying out a plurality of distance measuring operations, a distance measuring operation is started after a lapse of a predetermined time from the completion of the second integration in the previous distance measuring operation, whereby errors in measurement can be reduced, and the accuracy in distance measurement can be improved.

Also, as a distance measuring operation is started after a lapse of a predetermined time from the completion of the second integration in the previous distance measuring operation, the distance measuring time required for a plurality of distance measuring operations can be shortened. As a consequence, the time parallax during the period from the starting of the release operation until the termination of exposure can be reduced.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus comprising:
   light-projecting means for projecting a luminous flux toward an object at a distance to be measured;

light-detecting means for detecting reflected light of the luminous flux projected toward the object at a light-detecting position on a position sensitive detector corresponding to the distance to the object, and outputting a signal corresponding to said light-detecting position;

arithmetic means for carrying out an arithmetic operation according to the signal output from said light-detecting means, and outputting a distance signal corresponding to the distance to the object;

integrating means, having an integrating capacitor, for carrying out a first integration by discharging or charging said integrating capacitor according to the signal output from said arithmetic means, integrating the signal output from said arithmetic means, then carrying out a second integration by charging or discharging said integrating capacitor with a constant current to a voltage, comparing the voltage of said integrating capacitor to a reference voltage upon the second integration, and outputting a comparison result signal corresponding to the comparison;

detecting means for detecting the distance to the object according to the signal output from said integrating means; and control means for causing said light-projecting means to start projecting light after a lapse of a time from completion of outputting of the comparison result signal from said integrating means, causing said integrating means to output a plurality of comparison result signals with respect to the object, and causing said detecting means to detect the distance according to the plurality of comparison result signals.

2. The rangefinder apparatus according to claim 1, wherein said light-projecting means is an infrared light-emitting diode.

3. The rangefinder apparatus according to claim 1, wherein said light-detecting means outputs a near-side signal and a far-side signal.

4. The rangefinder apparatus according to claim 3, wherein said arithmetic means carries out an arithmetic operation according to an output ratio between the near-side signal and the far-side signal.

5. The rangefinder apparatus according to claim 1, wherein said arithmetic means and said integrating means are part of a single autofocus integrated circuit.

* * * * *